United States Patent
Kanazirev

[11] Patent Number: 5,935,894
[45] Date of Patent: Aug. 10, 1999

[54] ALUMINA BASED ADSORBENT CONTAINING ALKALI METAL COMPOUNDS

[75] Inventor: Vladislav I. Kanazirev, Baton Rouge, La.

[73] Assignee: LaRoche Industries, Inc., Baton Rouge, La.

[21] Appl. No.: 08/886,993

[22] Filed: Jul. 2, 1997

Related U.S. Application Data

[60] Provisional application No. 60/022,770, Jul. 30, 1996.

[51] Int. Cl.[6] .............. B01J 23/02; B01J 23/04; B01J 20/04; B01J 21/04
[52] U.S. Cl. ............ 502/341; 502/263; 502/344; 502/414; 502/415
[58] Field of Search .................. 502/415, 414, 502/263, 341, 344

[56] References Cited

U.S. PATENT DOCUMENTS

| | | | |
|---|---|---|---|
| 4,755,499 | 7/1988 | Neal et al. | 502/415 |
| 4,855,276 | 8/1989 | Osborne et al. | 502/415 |
| 5,427,995 | 6/1995 | Ziebarth et al. | 502/411 |

*Primary Examiner*—Michael Lewis
*Assistant Examiner*—Alexander G. Ghyka
*Attorney, Agent, or Firm*—Andrew Alexander

[57] ABSTRACT

A method of preparing an alumina-based bodies suitable for use as an adsorbent or catalyst, the method comprising providing a source of activated alumina powder for forming into bodies and providing an aqueous solution containing at least two different alkali metals, at least one alkali metal derived from a soluble carboxylic acid alkali metal salt. As said powder is formed into said bodies, the bodies are contacted or sprayed with the aqueous solution to provide composite bodies containing the alumina powder and the alkali metals and the soluble carboxylic acid alkali metal salt. Alternatively, the alumina bodies may be formed first and then contacted, e.g., soaked in the aqueous solution. Or, a viscous slurry of the activated alumina powder and the aqueous solution may be made. The viscous slurry may be made into bodies by extrusion or by the oil drop method. Thereafter, the bodies are thermally treated to activate alumina therein and remove or decompose the organic part, e.g., carboxylic acid, of the soluble carboxylic acid alkali metal salt.

60 Claims, 4 Drawing Sheets

THERMOGRAVIMETRIC (TG-DTG) ANALYSIS OF A MODIFIED ALUMINA
(PRIOR TO CARBON DIOXIDE ADSORPTION)

ALUMINA BASED ADSORBENT CONTAINING ALKALI METAL COMPOUNDS

CROSS REFERENCE TO RELATED APPLICATION

This application claims the benefit of U.S. Provisional Application No. 60/022,770, filed Jul. 30, 1996.

BACKGROUND OF THE INVENTION

This invention relates to adsorbents and more particularly it relates to improved alumina based bodies suitable for use as adsorbents and the method of making the bodies.

In forming alumina bodies suitable for adsorbing HCl, $H_2O$, $CO_2$ or $H_2S$, or the like, the bodies can be formed by several methods. For example, activated alumina powder can be mixed with water to make a slurry which is extruded to form pellets. Or, dry activated alumina powder can be added at a steady rate to a rotating pan and an aqueous solution sprayed on the powder as the pan rotates. The rotating pan forms the powder into spheres as it is sprayed. In another method, spheres or rounded bodies can be made from a viscous slurry of the activated alumina and aqueous solution using the so-called "oil drop" method.

It has been discovered that activated alumina impregnated with sodium containing compounds, for example sodium oxide, provides for increased adsorption. For example, U.S. Pat. No. 5,316,998 discloses an HCl adsorbent, and method of making and using the adsorbent, the adsorbent comprising an activated alumina promoted with an alkali metal oxide. The adsorbent contains at least about 5% alkali metal oxide. This patent discloses adding the alkali metal oxide using an alkali metal salt of an organic compound that decomposes at temperatures below 500° C. and liberates the organic portion.

U.S. Pat. No. 5,505,926 discloses an HCl adsorbent and method of making and using the adsorbent, the adsorbent comprising an activated alumina promoted with an alkali metal in an amount such that if calculated as alkali metal oxide, the adsorbent contains at least about 5% by weight alkali metal oxide. The adsorbent is used for removal of HCl from a fluid stream.

U.S. Pat. No. 4,755,499 discloses a sorbents comprising (a) an alumina substrate having a pore volume between 0.4 and 0.8 cc/g, and (b) an alkali or alkaline earth component, for example, sodium carbonate, wherein the amount of the alkali or alkaline earth component is between 50 and 400 $\mu$g per $m^2$ of the substrate. The sorbents of the invention are effective for the removal of nitrogen oxides, sulfur oxides and hydrogen sulfide from waste gas streams.

U.S. Pat. No. 2,378,155 discloses a process of producing adsorbent alumina comprising drying aluminum hydroxide to a water content of between 2–15 per cent by weight, and subsequently heating the resulting alumina in contact with water under super-atmospheric pressure at a temperature above 100° C.

U.S. Pat. No. 4,855,276 discloses an adsorbent composition, method of preparing same, and method of treating a fluid stream with the adsorbent. Alumina and carbon are combined with water in preferred proportions in one embodiment. Sodium bicarbonate and impregnates such as Group 1A metal hydroxides and Group 7A salts of Group 1A metals can be added. Improved efficiency of removal of compounds such as hydrogen sulfide is achieved, and ignition temperature is reduced.

U.S. Pat. No. 5,096,871 discloses alumina-containing acid adsorbents and process for producing same. The adsorbents comprise activated alumina and an amorphous alkali (preferably sodium) aluminum silicate. The ratio of Si:Al in the amorphous material is preferably 0.25–100:1 by weight. A process for producing such adsorbents comprises treating activated alumina with a solution of an alkali metal silicate followed by an alkali metal aluminate, and forming agglomerates of the treated alumina at a temperature below about 90° C., aging the agglomerates at a temperature in the range of 20°–90° C., and calcining the aged agglomerates at a temperature in the range of 200°–500° C.

However, in spite of these disclosures, there is still a great need for improved alumina bodies containing at least two alkali or alkaline earth metals, alkali or alkaline earth metal compounds or combinations thereof.

SUMMARY OF THE INVENTION

It is an object of the invention to provide an improved process for forming alumina bodies impregnated with at least two alkali metal or alkaline earth metal compounds.

It is another object of this invention to provide an improved process for forming alumina bodies impregnated with or containing at least two alkali or alkaline earth metal oxides.

Still, it is another object of this invention to provide an improved process for incorporating or impregnating alumina bodies with at least two alkali or alkaline earth metal compounds, at least one of which is a water soluble, alkali or alkaline earth metal salt of an organic compound.

And, yet it is another object of the invention to provide a process for incorporating or impregnating alumina bodies with at least two different alkali or alkaline earth metal salts of an organic compound.

Still yet another object of the invention is to contact formed alumina bodies with an aqueous solution containing at least two different alkali or alkaline earth metal salts of soluble carboxylic acid.

And still yet, it is another object of the invention to provide a viscous slurry for forming into bodies, the slurry comprised of active alumina powder and an aqueous solution containing at least two different alkali or alkaline earth metals of soluble carboxylic acid.

Still another object of the invention includes providing alumina based bodies suitable for catalysts or adsorbents containing two different alkali or alkaline earth metal compounds bonded thereto and having improved adsorption capacity.

These and other objects will become apparent from a reading of the specification and claims appended hereto.

In accordance with these objects, there is provided a method of preparing an alumina-based bodies suitable for use as an adsorbent or catalyst, the method comprising providing a source of activated alumina powder for forming into bodies and providing a source of at least two different alkali or alkaline earth metals. At least one of the two different alkali or alkaline earth metals is provided in an aqueous solution. Preferably, at least one alkali metal is derived from a soluble carboxylic acid alkali metal salt. As the powder is formed into said bodies, the bodies are contacted or sprayed with the aqueous solution to provide composite bodies containing the alumina powder and the alkali or alkaline earth metals. One of the alkali or alkaline earth metal or metal compounds may be added to the alumina in powder form. That is, it may be mixed with the alumina powder or added substantially continuously as the alumina powder is formed into nodules or bodies. Alternatively, the alumina bodies may be formed first and then contacted, e.g., soaked in the aqueous solution. Or, a viscous slurry of the activated alumina powder and the aqueous solution may be made. The viscous slurry may be made into bodies by extrusion or by the oil drop method. Thereafter, the bodies are thermally treated to activate alumina therein and remove or decompose the organic part, e.g., carboxylic acid, of the soluble carboxylic acid alkali metal salt.

DETAILED DESCRIPTION OF THE PREFERRED EMBODIMENTS

In accordance with the invention, there is provided a method for producing activated alumina bodies impregnated or promoted with at least two alkali or alkaline earth metals or alkali metal compounds, e.g., alkali or alkaline earth metal oxides. The method comprises using a source of activated alumina powder and a source of two different alkali or alkaline earth metals. At least one of the alkali or alkaline earth metals may be supplied in an aqueous solution and one may be supplied in powder form. Preferably, at least one of the alkali or alkaline earth metals is derived from a soluble organic alkali or alkaline earth metal salt such as a soluble carboxylic acid alkali or alkaline earth metal salt. It will be appreciated that combinations of alkali and alkaline earth metals or salts may be used. For example, the solution can comprise two water soluble alkali or alkaline earth metal inorganic salts or two organic salts or combination of inorganic and organic salts of alkali or alkaline earth metals. It is the combination of two different alkali or alkaline earth metal compounds with which the bodies are promoted or activated that is important, as demonstrated herein. The activated alumina powder is formed into alumina bodies using an aqueous solution to bond particles of the alumina powder together by rehydration. Using the solution results in efficiently incorporating high levels of alkali or alkaline earth metal compounds such as sodium oxide and potassium oxide or sodium oxide and calcium oxide, e.g., 0.2 to 8 wt. % $Na_2O$ and 0.2 to 8 wt. % CaO, into the alumina bodies to provide for improved properties such as increased surface area and crush strength which results in improved adsorption and catalytic properties. It should be noted that the alumina powder and a powder of the alkali or alkaline earth metal compound may be mixed on a dry basis and thermally treated to form the bodies of alumina containing the alkali or alkaline earth metal compound. Such bodies can contain 0.2 to 6 $\mu$moles/m$^2$ sodium oxide and 0.2 to 8 $\mu$ moles/m$^2$ calcium oxide, depending on the surface area of the alumina used.

The activated alumina referred to includes alumina having a surface area usually greater than 100 m$^2$/g and typically in the range of 100 to 550 m$^2$/g. Further, the activated alumina powder is preferably obtained by rapid dehydration of aluminum hydroxides, e.g., alumina trihydrate or hydrargillite in a stream of hot gasses. Dehydration may be accomplished in any suitable apparatus using the stream of hot gases. Generally, the time for heating or contacting with the hot gases is a very short period of time, typically from a fraction of a second to 4 or 5 seconds, for example. Normally, the temperature of the gases varies between 400° and 1000° C. The process is commonly referred to as flash calcination and is disclosed in U.S. Pat. No. 2,915,365, incorporated herein by reference. However, other methods of calcination may be employed to dehydrate or partially dehydrate the trihydrate.

The activated alumina suitable for use in the present invention for forming alumina bodies or agglomerates has a median particle size in the range of 0.1 to 300 microns, preferably 1 to 100 microns and typically 1 to 20 microns. In certain instances, it may be desirable to use a median particle size of 1 to 10 microns. The activated alumina typically has an LOI (loss of ignition) in the range of about 5 to 12% at a temperature of 200° to 1000° C. The alumina may be ground to the desired particle size before or after activation.

A source of activated alumina is gibbsite which is one form of alumina hydrate derived from bauxite using the Bayer process. However, alpha alumina monohydrate, pseudoboehmite or the alumina trihydrate may be used. Other sources of alumina may also be utilized including clays and aluminum alkoxides. Also, alumina gel may be used as a source of the alumina.

For purposes of forming alumina bodies or agglomerates in accordance with one aspect of the invention, an aqueous solution is formed containing at least two alkali or alkaline metals. The alkali metals used in the invention can include Group 1A of the periodic table. However, the preferred alkali metals include Na, K, Cs and Li. The alkaline earth metals useful in the invention include Group IIA of the periodic table with Ca, Ba, Mg and Sr being typical of the alkaline earth metals with Ca being the preferred alkaline earth metal.

When a bivalent ion such as $Ca^{+2}$ (dia. 0.99 Å), $Mg^{+2}$ (dia. 0.65 Å), $Ba^{+2}$ (dia. 1.35 A) is used, it is beneficial to combine it with a monovalent ion such as $Na^+$, $K^+$ or $Cs^+$ in order to cover the surface of the alumina with basic sites which, as noted, provide more effective adsorbents or catalyst. The bivalent ion, e.g., $Ca^{+2}$, in an ideal situation has to compensate or react with an entity containing two aluminum atoms or sites in the alumina structure. However, not all aluminum atoms are located to react in such a manner. Further, $Ca^{+2}$ can attract water forming $CaOH^+$ cations leaving some alumina sites covered by acidic $H^+$ ion instead of the basic metal ion. The monovalent ion such as $Na^+$ is very beneficial when combined with the bivalent ions because it reacts to provide more coverage on the alumina surface with more basic sites which provide for more effective adsorbents or catalysts.

The alkali or alkaline metals are derived from salts of these metals and can include organic salts or inorganic salts. For purposes of obtaining two metals in the aqueous solution, different water soluble, alkali or alkaline earth metal inorganic salts may be used or different alkali or alkaline earth metal organic salts may be used. The preferred salts are water soluble, alkali or alkaline earth metal hydroxides or water soluble alkali or alkaline earth metal carboxylic acid salts. Such hydroxides include, for example, calcium, sodium, potassium and lithium hydroxide. The water soluble, organic salts include, for example, formates, acetates, propionates and butyrates of sodium, potassium and lithium. For purposes of providing at least two metal compounds on the alumina bodies, the aqueous solution can comprise a combination of an inorganic metal compound, e.g., metal hydroxide such as sodium or potassium hydroxide, and an organic compound, e.g., metal acetate such as sodium or potassium acetate.

Potassium and cesium are more basic than sodium and will create more efficient sites on alumina for selected applications. Further, potassium and cesium acetates are more soluble than sodium acetate. Solutions of aqueous solutions containing both sodium and potassium, sodium and cesium, potassium and cesium, or sodium and potassium and cesium are effective in the present invention and may be supplied as a water soluble metal salt, e.g., a carboxylic acid salt such as a formate or acetate.

For purposes of the present invention, the aqueous solution containing two water soluble alkali or alkaline earth metal compounds is provided at a pH in the range of about 5.5 to about 13.8. However, for an alkali or alkaline earth metal acetate solution, the pH useful in the invention can extend from about 7 to 9 with typical solutions being in the range of about 7.3 to 8.5, depending to some extent on the acetate concentration and amount of dissolved carbon dioxide. If it is desired to provide a pH lower than 7 or 7.3, this may be accomplished by adding an organic acid such as acetic acid to the solution. If it is desired to use a pH greater than 8.5, this may be achieved by adding metal hydroxide such as an alkali or alkaline earth metal hydroxide. Maintaining a controlled pH is important because it affects the rate of reaction of the alkali or alkaline earth metal compound with the alumina surface. For example, at a high pH of about 13, the reactions of transitional alumina, i.e., dissolution and re-precipitation as in other alumina phases, are accelerated.

pH relates to loading of the metal component or promoter on the alumina in the subject invention. For example, in the present invention, a lower content of alkali or alkaline earth metal on the alumina, e.g., 1 to 4.5 wt. % $Na_2O$, or the equivalent amount of other alkali metal, e.g., 1.5 to 6 wt. % $K_2O$, would require a higher pH, e.g., about 12 to 13.8, while a lower pH, e.g., 6 to 11, would be suitable for higher metal loadings. A preferred pH is in the range being about 10 to about 13.5. A typical pH useful in the invention is in a range of 10.5 to 13.

Figure 1:
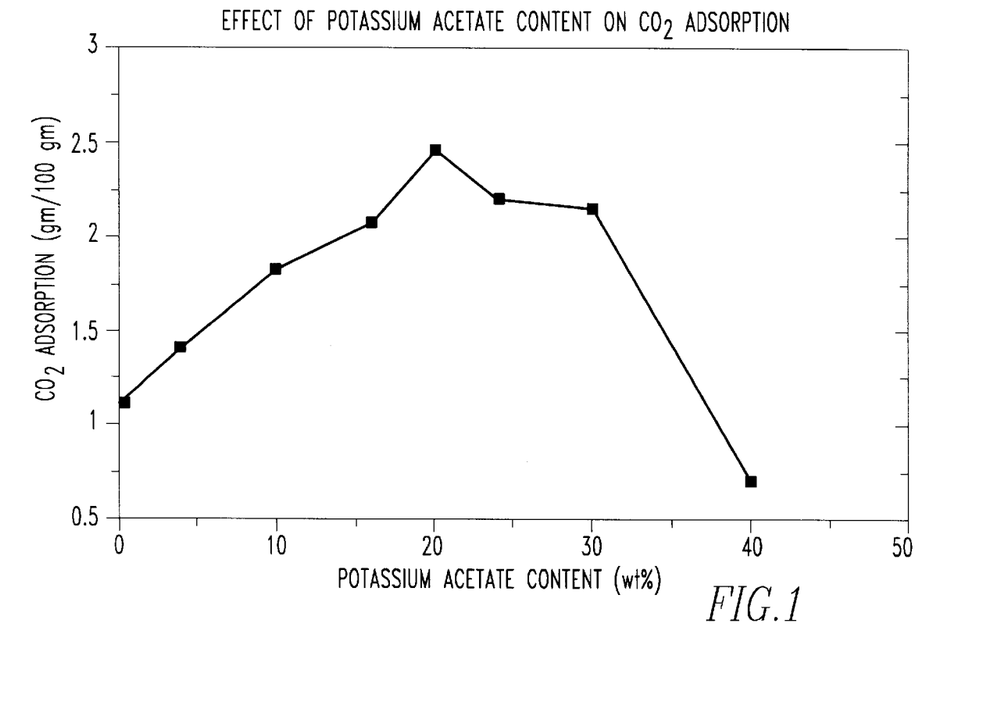
FIG. 1 shows $CO_2$ adsorption on potassium acetate doped alumina at different levels of potassium acetate.

With respect to alkali or alkaline earth metal acetate or metal hydroxide, the amount provided or maintained in the aqueous solution is important. That is, it has been discovered that the amount of metal acetate provided or deposited on the alumina is important with respect to the amount of $CO_2$ adsorbed. For example, FIG. 1 shows that flash calcined alumina (BET 282 $m^2/gm$) having a potassium acetate content in the range of about 10 to 33 wt. % at about 0.3 wt. % sodium oxide loading had superior $CO_2$ adsorption capacity than lower or higher amounts of potassium acetate. The potassium acetate was added to the alumina in powder form. The thermal treatment and $CO_2$ adsorption were substantially as described in Example 1. Thus, it will be seen that to obtain the 10 to 33 wt. % level, the amount or concentration of potassium acetate provided in the aqueous solution is important. Weight percent potassium acetate converts to weight percent potassium oxide and to $\mu$ moles/m2 potassium as shown in Table 1 as follows:

TABLE 1

| Potassium Acetate (wt. %) | $K_2O$ (wt. %) | $\mu$ moles/m$^2$ potassium |
|---|---|---|
| 10 | 5.6 | 4.5 |
| 20 | 11.24 | 9.1 |
| 30 | 16.87 | 13.7 |
| 40 | 22.49 | 18.3 |

In, the alumina bodies are provided with the alkali or alkaline earth metal component ot promoter to a controlled level. The alkali or alkaline earth metal component can be present on the surface of the alumina comprising the body from about 0.5 to 25$\mu$ moles per m$^2$ of surface area constituting the alumina body.

Preferably, the alkali or alkaline earth component is present in the amount of 1 to 18$\mu$ moles per m$^2$ of surface area. A typical amount of alkali or alkaline earth metal component is present on the surface of the alumina in the body in the range of 1 to 12$\mu$ moles per m$^2$ of surface area. When the alumina bodies contain sodium oxide and potassium oxide, this component can be present in the range of 1 to 13$\mu$ moles sodium oxide per m$^2$ of surface area and 5 to 15$\mu$ moles potassium oxide per m$^2$ of surface area.

In addition, the ratio of the first alkali or alkaline earth metal component to the second alkali or alkaline metal component present on the surface of the alumina body is important. The metal components can be present on the surface in a ratio of 1:50 to 50:1 first metal component to second metal component. When the first alkali metal component present on the surface is sodium oxide and the second alkali metal component is calcium oxide, these components can be present in a ratio of 1:25 to 25:1. These ratios are calculated as $\mu$ moles/m$^2$ of the alumina component.

The weight percent of the soluble alkali or alkaline metal salt in the solution can vary substantially depending on the metal salt being dissolved. For example, sodium acetate can range in solution from 1 to 33 wt. % and the potassium acetate can range from 1 to 55 wt. %. in solution. Ranges set forth herein include all the numbers within the range as if specifically set forth. The temperature of the solution can range from 5° to 75° C. for purposes of application to the alumina.

When alumina bodies are activated or promoted with both sodium and potassium acetate, the resulting agglomerates have superior properties compared to alumina bodies promoted or doped with only a sodium component (see Table 2). For example, alumina bodies produced from flash calcined alumina having a median particle size of 7 $\mu$m and treated with a combination of sodium acetate and potassium acetate, the treated bodies were found to have superior $CO_2$ adsorption capacity compared to alumina bodies promoted with only a sodium component as shown in Table 2 as follows:

TABLE 2

|  | B | A |
|---|---|---|
| $Na_2O$ (wt. %) | 2.62 | 8.6 |
| $K_2O$ (wt. %) | 6.37 | 0 |
| Bulk Density (lb/ft$^3$) | 45.3 | 49.9 |
| LOI (wt. %) | 2.8 | 3.4 |
| BET Surface Area (m$^2$/gm) | 239 | 240 |
| Abrasion Loss (wt. %) | 1.7 | 1.8 |
| Crush Strength (lb) | 14.3 | 11 |

TABLE 2-continued

| Macroporosity | cc/gm | 0.176 | 0.163 |
|---|---|---|---|
| $CO_2$ Total Adsorption | gm/100 gm | 3.45 | 3.02 |
| $CO_2$ Strongly Adsorbed | gm/100 gm | 3.06 | 2.66 |

Strongly adsorbed $CO_2$ is $CO_2$ remaining adsorbed on a sample for at least 5 minutes after the $CO_2$ flow was replaced with a helium purge.

The crush strength was determined using 25 balls each of Sample A and B having a 6 mesh size. The balls were individually subjected to loading in a Chatillon compression testing apparatus. The gauge reading in pounds at the breaking point of each ball was recorded and averaged.

Further, it will be seen that the Sample B formed by sodium and potassium acetate had a higher crush strength as well as a higher $CO_2$ adsorptive capacity. Sample B was produced as described in Example 1. The bodies in Sample A are commercially available sodium doped alumina bodies formed using a pan nodulizer. Sample B had a higher $CO_2$ adsorptive capacity and higher crush strength compared to the bodies containing no potassium oxide.

In the subject invention, potassium and cesium, for example, are particularly effective because they are more basic than sodium and thus provide more active sites. Also, cesium and potassium oxides are significantly more basic than sodium lithium oxide. Further, it should be noted that potassium and cesium acetates are more soluble in water than sodium acetate.

Figure 2:
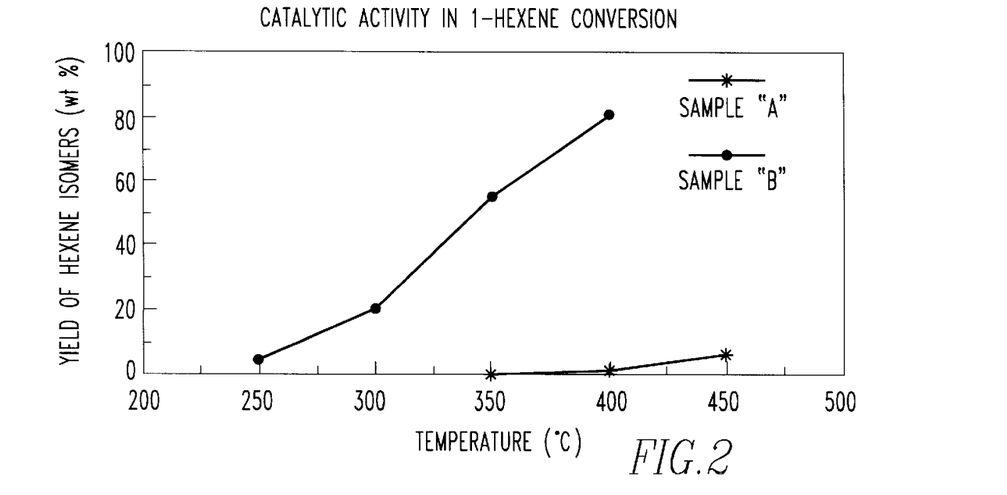
FIG. 2 is a graph showing the effectiveness of sodium/potassium doped alumina in converting 1-hexene to 2-hexene and 3-hexene.

The superiority of a sodium/potassium promoted alumina is further illustrated in the conversion of 1-hexene to 2-hexene. This conversion proceeds by a double bond shift to provide 2-hexene and 3-hexene to a lesser extent. 2-hexene is the only product at low conversion. No hydrocarbon chain branching occurs with both sodium and potassium which together with a shift of the 2-hexene isomers to more "cis" than "trans" isomers indicates that the reaction is catalyzed by a solid base. The conversion is shown in FIG. 2 using Sample A and Sample B (Table 2). It will be seen that Sample B containing sodium and potassium achieved a much higher conversion at a lower temperature compared with Sample A which only contained sodium. That is, Sample A was much less effective and required a higher temperature to initiate conversion.

It will be appreciated that the 1-hexene reaction can be catalyzed both by acidic sites and basic sites provided on the alumina. However, the stronger the basic site, the more effective is the catalysis of the reaction. Potassium is more effective because it provides a more basic site on the alumina to effect the reaction. However, the potassium ion and cesium ion are much larger than the sodium and thus must be used in conjunction with the sodium. The cesium ion is 1.69 Å; the potassium ion is 1.33 Å; and the sodium is 0.95 Å. The larger potassium ion, while more basic and a more effective reactant on alumina, can be limited in its access to all alumina sites and can operate to clog the alumina pore system, thus adversely affecting reaction. While not wishing to be bound by theory of invention, the alkali or alkaline earth metal in its ionic form is probably attached by oxygen atoms to the positively loaded aluminum atoms exposed on the surface of the alumina. Bulky cations such as potassium or cesium have greater difficulty accessing all the alumina sites but are desirable because they are highly efficient as basic sites. Thus, it has been discovered that a controlled blend of alkali or alkaline earth metals, such as potassium and sodium, provide a better distribution of alkali or alkaline earth metal on the alumina surface enhancing or improving its basic property without the detriment of a single metal. The blend improves the reaction converting 1-hexene to 2-hexene, for example.

Thus, it will be seen from FIG. 2 that sodium/potassium promoted alumina has greatly improved catalytic capability compared to sodium doped alumina.

After formation, the alumina bodies are cured or dried for purposes of rehydration which can occur from room temperature to temperatures up to about 200° C. Further, the time for curing can range from a few minutes up to 25 hours or more, depending on the conditions. During curing, water may be added for purposes of rehydration. Normally, when the alumina bodies are formed from a viscous slurry or by spraying as noted above, sufficient water is present for purposes of rehydration to provide cured bodies. In some instances, it may not be necessary to dry or cure the bodies prior to activation.

After curing, the bodies are heated for purposes of activating and removing water of hydration, decomposing or removing the organic part. Typically, the bodies are heated to provide bodies with an LOI in the range of about 2 to 6%. Normally, the bodies are heated at a temperature in the range of about 275° to about 600° C. or higher, e.g., 1100° C., for removing water of hydration to the desired level. Time at temperature can range from 5 to 70 minutes. The ranges given herein are inclusive of all the numbers within the range as if specifically set forth.

After curing, the alumina bodies are preferably activated by a two-step heating process. In the first step, the bodies are heated in a temperature range of 65° to 270° C. for a period of 0.5 to 12 hours. Heating for this period at this temperature range has the effect of distributing active components on the surface and attaching them to the alumina surface sites. Also, excess water is removed in this step. Thereafter, the alumina bodies are heated in a temperature range of 270° to 700° C. for a period of 0.1 to 5 hours. The second step of heating operates to force the reaction between alumina and the alkali or alkaline earth metal component in a water-poor environment. Also, volatile reaction products are removed from the adsorbent surface. The heating may be carried out in a batch operation wherein the temperature is raised to the first temperature and held there for the required time before raising to the second temperature for the required time period. Alternatively, the alumina bodies may be heated continuously on a conveyor belt which passes through two furnaces. The speed of the belt is adjusted to provide the required time at temperature.

Activated alumina bodies formed in accordance with the invention have a surface area in the range of 50 to 550 $m^2/g$ at sodium oxide levels of 0.3 to 10 wt. % and potassium oxide levels of 0.2 to 17 wt. %, for example. Further, the bodies have a pore volume distribution of at least 0.05 cc/g at a pore diameter of 750 Angstroms. The crush strength of the activated alumina bodies can range from 7 to 30 lbs tested, as noted earlier. The crush strength is higher for alumina balls formed using two different alkali or alkaline earth metals. By substantially no potassium oxide is meant less than 0.1 wt. %.

While the invention has been described with respect to relatively pure activated alumina or activated alumina derived from the Bayer process, activated aluminas having substantial levels of alkali or alkaline earth metals or alkali or alkaline earth metal compounds, e.g., alkali or alkali earth metal oxides such as $Na_2O$ incorporated therein may be used as the starting material for applying aqueous solution containing at least alkali or alkaline earth metals, as noted above. For example, activated alumina containing 0.3 to 8 wt. % $Na_2O$ may be used as a starting material. After pan nodulizing, for example, curing and activating, alumina bodies having at least 6 wt. % $Na_2O$ and typically 7 to 13 wt. % $Na_2O$ and, for example, having at least 6 wt. % $K_2O$ and typically 6 to 10 wt. % $K_2O$ can be obtained. The activated bodies can contain $Na_2O$ in a range of 9 to $13\mu$ moles/m$^2$ and 5 to $9\mu$ moles/m$^2$ $K_2O$. However, the $Na_2O$ can range from 0.3 to $20\mu$ moles/m$^2$ and the $K_2O$ can range from 0.1 to $12\mu$ moles/m$^2$, calculated on the surface area of the starting balls.

The use of a high pH aqueous solution in accordance with the invention has the effect of delivering substantial levels of alkali or alkaline earth metal such as sodium and potassium or sodium- and potassium-containing compounds to the alumina surface to permit reaction with the alumina. While the inventor does not wish to be bound by any theory of invention, it is believed that the high pH as well as delivering sodium and potassium to the activated alumina surface has the effect of promoting a reaction between alumina and the alkali or alkaline earth metal, e.g., sodium and potassium. The high pH is believed to have a combination of effects. That is, the alumina is dissolved layer by layer in the alkaline solution and then the more insoluble and stable aluminum hydroxide is re-precipitated on the remaining surface area. At higher pH, the dissolution and re-precipitation reaction is accelerated. As a result, less original calcined alumina grains remain and more cementation bonds of aluminum hydroxides are formed between residual calcined alumina grains. In addition, it is believed that the reaction between alkali metal hydroxide, e.g., sodium hydroxide, and alumina leads to an aluminate surface species, e.g., sodium aluminate, upon heating to activation. The formation of soluble sodium aluminate is also accelerated by a high pH. The higher levels of aluminum hydroxide formation can be measured by thermal gravimetric analysis or x-ray diffraction analysis.

A higher level of aluminum hydroxide results in a higher BET surface area in alumina nodules or alumina bodies formed by the process of this invention.

In the present invention, increased aluminum hydroxide results in increased crush strength of the nodules. This results from the increased cementatious bonding provided by the aluminum hydroxide material.

Nodules made by the process of the invention can have increased removal of alumina acid sites. The higher levels of sodium, for example, in a form of surface aluminate, provides for more effective neutralization of alumina acid sites. That is, it is believed that the strongest acid sites are involved in aluminate formation. Thus, the more effective neutralization of the acid sites on the alumina leads to a higher level of inertness in the activated alumina nodules or bodies. The effect is pronounced at a relatively low alkali metal content, e.g., less than about $5\mu$ mole/m$^2$. A higher alkali metal content results in introducing the surface functionality of a solid base and enhancement in 1-hexene conversion or $CO_2$ adsorption, for example.

Alumina bodies produced in accordance with the present invention are useful as a drying agent, an adsorbent, a catalyst or catalyst support for example. When used as an adsorbent, they are very effective in removing HCl, oxides of nitrogen, other contaminants from industrial waste streams. Because the alumina bodies of the invention have high surface area and crush strength, they are particularly effective an adsorbent for either gas or liquid streams and are very effective for substances having acidic properties such as organic acids, for example.

While the bodies have been described in terms of sodium and potassium, it will be appreciated that the bodies can contain other combinations of at least two alkali or alkaline earth metal compounds such as alkali or alkaline earth metals oxides. Thus, the activated alumina bodies can contain from about 0.4 to 40 wt. % of at least two alkali or alkaline earth metal oxides. In terms of surface area, the activated alumina can contain 0.5 to $25\mu$ moles/m$^2$ of at least two alkali or alkaline earth metal oxides. The amount of each of the at least two alkali or alkaline earth metal compounds, e.g., oxides, can vary within this range, and such ranges for each of the ranges for the two alkali or alkaline earth metal compounds are included as if specifically set forth. For example, the alumina having a BET surface area of about 300 m$^2$/g promoted or impregnated body can comprise 0.2 to 7.5 wt. % of a first alkali or alkaline earth metal oxide and 0.2 to 18 wt. % of a second alkali or alkaline earth metal oxide. In terms of surface area, the alumina bodies can contain 1 to $20\mu$ moles/m$^2$ of the first alkali or alkaline earth metal oxide and 1 to $25\mu$ moles/m$^2$ of a second alkali or alkaline earth metal oxide.

While the invention has been described herein where at least two alkali or alkaline earth metals or metal compounds are applied in an aqueous solution to the alumina bodies as the bodies are forming, it will be appreciated that any method of adding or introducing the alkali or alkaline earth metal compounds to the alumina bodies is contemplated within the invention. For example, one of the alkali or alkaline earth metal compounds, e.g., $Ca(OH)_2$ (lime), may be added as a powder, for example, during formation of the alumina or by mixing with the alumina powder prior to forming. Alternatively, both alkali or alkaline earth metal compounds may be added as a powder prior to or during forming and water added for purposes of rehydration as the body is formed. Any of these methods are contemplated within the purview of the invention.

While the preferred method of forming activated alumina bodies containing, for example, two or more alkali or alkaline earth metal compounds is the use of a pan nodulizer in which the solution is sprayed on the bodies as they are forming, it should be understood that any method of incorporating a double promotor into the bodies of alumina may be used. The invention as set forth herein is meant to include the various methods of applying the solutions as if specifically set forth.

While alumina has been disclosed as a base material, other base materials such as hydrotalcite, titanium oxide and gallium oxide or combinations of oxides may be used in accordance with the invention.

The following examples are further illustrative of the invention.

EXAMPLE I

Figure 3:
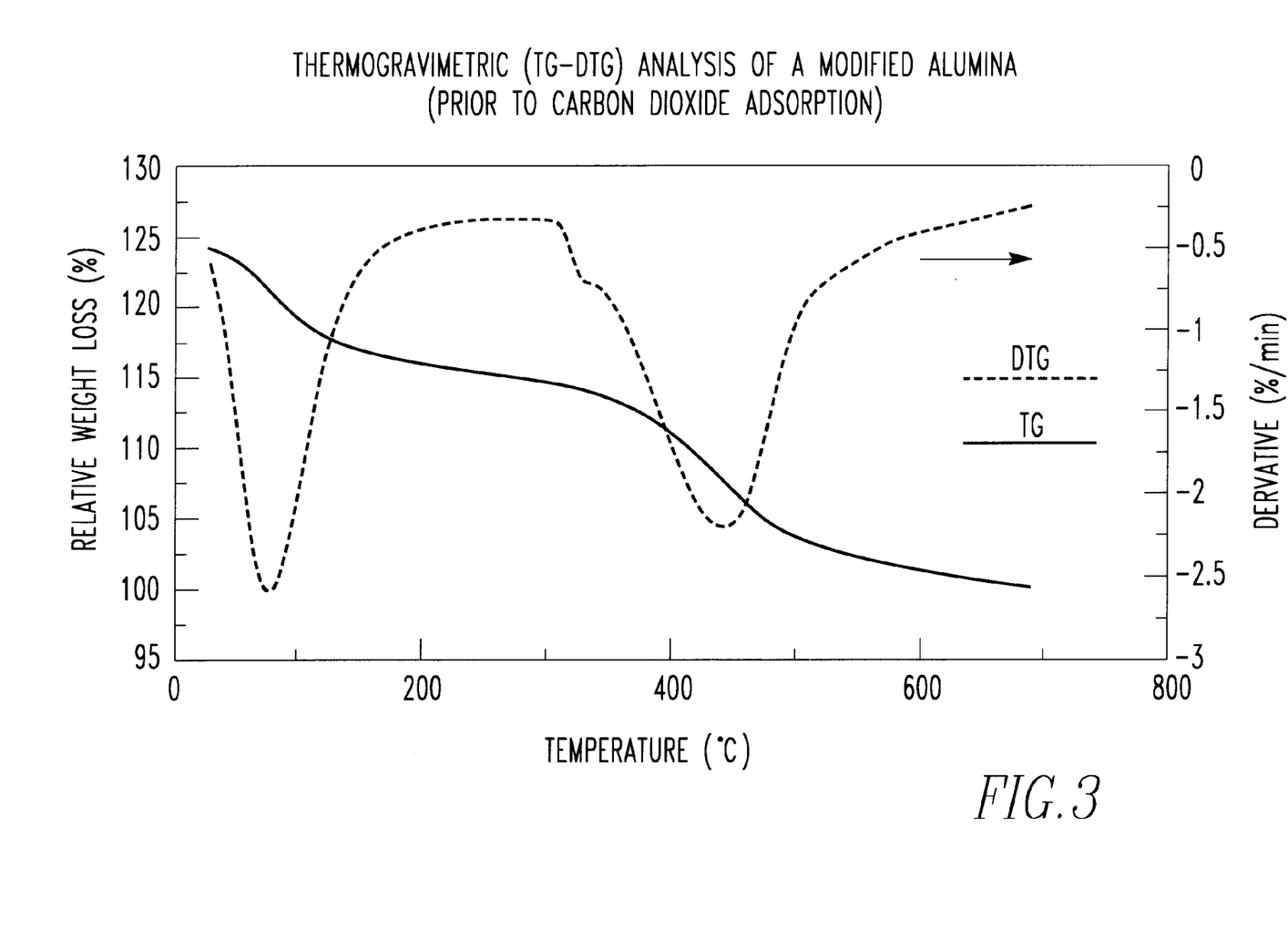
FIG. 3 shows a TG-DTG pattern of flash calcined alumina containing about 0.3 wt. % sodium oxide and 20 wt. % potassium acetate.
Figure 4:
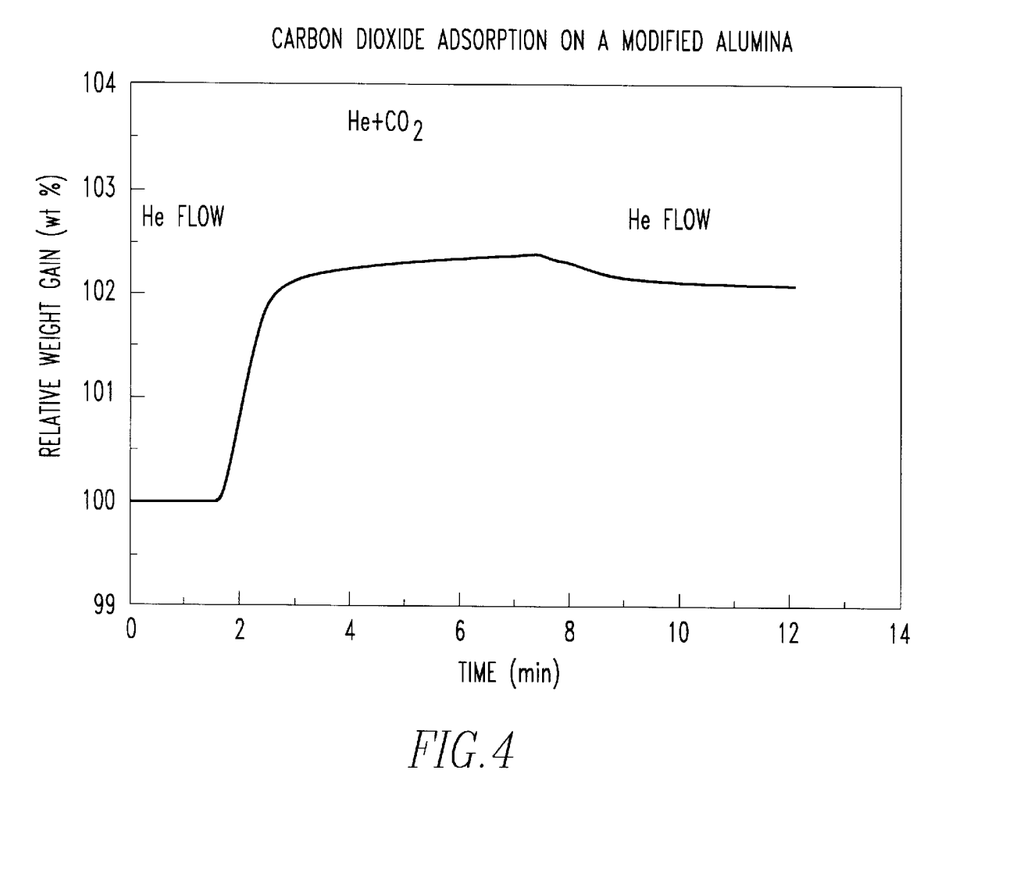
FIG. 4 shows carbon dioxide adsorption on 20 wt. % potassium acetate flash calcined alumina.
Figure 5:
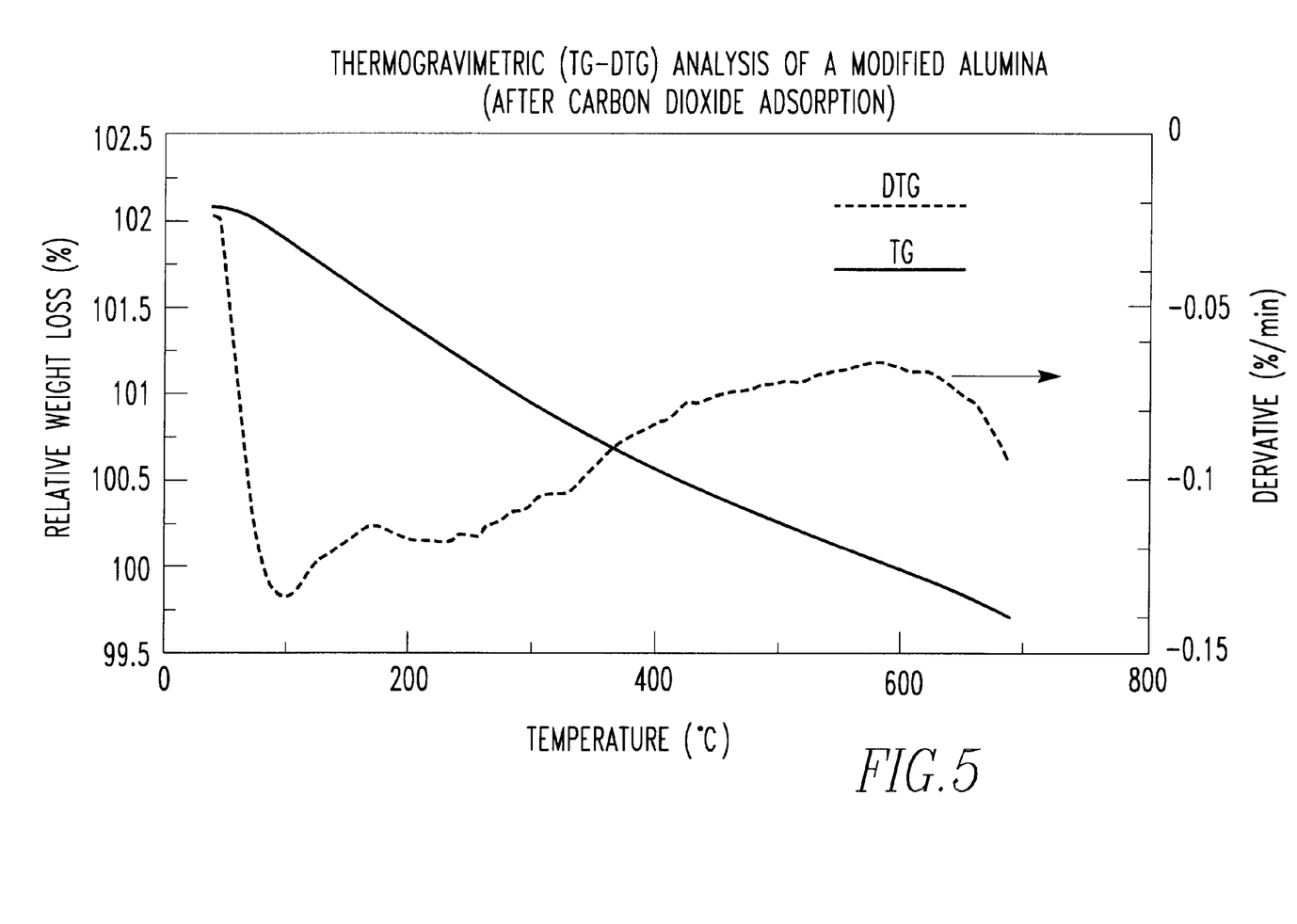
FIG. 5 shows a TG-DTG pattern of flash calcined alumina containing 20 wt. % potassium acetate after carbon dioxide adsorption.

In this example, flash calcined alumina having a median particle size of 7 microns, a BET surface area of 282 m$^2$/g and a loss of ignition of 6 wt. % was fed to a pan nodulizer at a rate of 930 gm/min. An aqueous solution was prepared containing 16 kg of potassium acetate and 7.5 kg of sodium acetate dissolved in 45 kg of water. The solution was adjusted to a pH of about 12.8 by adding sodium hydroxide to the solution. The solution was fed at a rate of 850 gms/min to the pan nodulizer. The rounded nodules produced were cured for about 3 hours at about 80° C. A portion of the cured nodules were ground and tested for $CO_2$ adsorption. About 20 milligrams of the ground nodules were provided on a platinum pan of a TAG7 microbalance and purged with 110 cc/min helium flow while raising the temperature from 25° to 700° C. at a rate of 25°/min. After rapid cooling to 40° C. and 1 minute equilibration time at this temperature, the helium flow was replaced with an equal flow of about 1.5 vol. % carbon dioxide in helium for 6 minutes and then restored to the original purge with pure helium. Finally, the temperature was brought again to 700° C. at a rate of 25°/min. The sample weight was registered in all three stages of the experiment. FIGS. 3, 4 and 5 show the relative weight in percents during all three stages of the thermogravimetric analysis experiment. The weight of the sample calcined at 700° C. is set at 100%.

FIG. 3 shows that a reaction between potassium acetate and FCA alumina takes place on thermal treatment. This is evidenced by the large weight loss above about 300° C. on the TG curve and the corresponding derivative peak on the DTG curve. These are caused by reaction occurring between the two components. No such thermogravimetric evidence is obtained with the individual components because acetate decompositions in the absence of alumina occur at much higher temperatures. Table 3 summarizes data on the total carbon dioxide adsorption and the strongly-held $CO_2$ derived from the weight increase at the $7^{th}$ and $12^{th}$ minute, respectively. The ratio T/S provides a useful parameter when comparing different adsorbents.

TABLE 3

| Alumina | Activator | Preparation | Carbon Dioxide Adsorbed gms/100 g Adsorbent | | |
|---|---|---|---|---|---|
| | | | Total | Strong | T/S |
| Flash calcined alumina | sodium and potassium acetate | conodulized | 4.12 | 3.56 | 1.16 |

EXAMPLE 2

In this example, calcium and sodium materials were added to flash calcined alumina to produce Sample C. The flash calcined alumina had the properties described in Example 1. The alumina was fed to a pan nodulizer at a rate of about 1.8 kg per minute. Also, powdered $Ca(OH)_2$ was added at a rate of 0.14 kg/min. The powdered mixture was sprayed with a solution at about 1 kg/min of solution. The solution was prepared by dissolving 14 kg anhydrous sodium acetate in 85 kg of water and adding thereto about 0.45 kg 50% sodium hydroxide solution. The balls produced were cured in a sealed container at room temperature and then activated at about 400° C. for one hour in an air purged oven. Several different samples were produced in this manner to provide different nodules having the levels of sodium and calcium on a metal oxide basis indicated in Table 4. Table 4 also provides the level of sodium and calcium on a metal basis in $\mu$ moles per unit of surface area and the effectiveness in adsorbing $CO_2$.

TABLE 4

| | Metals | | | | $CO_2$ adsorption |
|---|---|---|---|---|---|
| | Sodium | | Calcium | | wt. % |
| Sample | wt. % | $\mu$ moles/m² | wt. % | $\mu$ moles/m² | (g/100 g adsorbent) |
| C | 3.2 | 4.1 | 4.8 | 3.4 | 2.9 |
| D | 0.3 | 0.35 | 0 | 0 | 1.1 |

TABLE 4-continued

| | Metals | | | | $CO_2$ adsorption |
|---|---|---|---|---|---|
| | Sodium | | Calcium | | wt. % |
| Sample | wt. % | $\mu$ moles/m² | wt. % | $\mu$ moles/m² | (g/100 g adsorbent) |
| E | 0.3 | 0.34 | 6.0 | 4.2 | 2.4 |
| F | 2.6 | 3.14 | 0.2 | 0.13 | 2.2 |
| G | 4.0 | 5.2 | 5.0 | 3.6 | 3.0 |

Thus, it will be seen from Table 4 that superior $CO_2$ adsorption was obtained with the use of calcium present in combination with sodium.

Samples C and E and new Sample H were tested for 1-hexene conversion to 2-hexene. For this test, a flow reactor having 70 mg of ground sample was used. 1-hexene vapor was delivered to the reactor by bubbling 20 cc/min helium through a saturator containing 1-hexene liquid at 0° C. The sample was thermally treated at 350° C. prior to 1-hexene feed introduction. An on-line gas chromatographic analysis was employed to analyze feed and products. The results are provided in Table 5.

TABLE 5

| | $\mu$ mole/m² | | Hexene conversion in % | |
|---|---|---|---|---|
| Sample | Sodium | Calcium | 400° C. | 450° C. |
| C | 4.1 | 3.4 | 12 | 39 |
| E | 0.34 | 4.2 | 7 | 25 |
| H | 4.2 | 0 | 2 | 7 |

It will be seen from Table 4 that where calcium was employed along with sodium, higher conversion was obtained.

While the invention has been described in terms of preferred embodiments, the claims appended hereto are intended to encompass other embodiments which fall within the spirit of the invention.

What is claimed is:

1. A method of preparing activated alumina composite bodies containing at least two alkali or alkaline earth metal compounds suitable for use as adsorbent or catalyst bodies comprising:
   (a) providing activated alumina powder for forming into bodies;
   (b) providing a source of at least two different alkali or alkaline earth metals, at least one alkali or alkaline earth metal derived from a water soluble carboxylic acid alkali or alkaline earth metal salt or a water soluble alkali or alkaline earth metal inorganic salt;
   (c) introducing said alkali or alkaline earth metals to said activated alumina powder in the presence of water to form composite bodies containing said alumina powder and at least two alkali or alkaline earth metals or alkali or alkaline earth metal salts; and
   (d) thermally treating to calcine said composite bodies in a temperature range of about 200° to 1100° C. to provide activated alumina bodies having improved adsorbent or catalytic properties compared to an alumina body containing a single alkali or alkaline earth metal compound.

2. The method in accordance with claim 1 including providing said alumina in a particle size in the range of 0.1 to 300 $\mu$m and in a surface area in the range of 50 to 550 m²/gm.

3. The method in accordance with claim 1 including providing said powdered material in a particle size in the range of 1 to 100 µm.

4. The method in accordance with claim 1 wherein said water soluble carboxylic acid metal salt is a metal acetate wherein the metal is selected from at least one of the group consisting of Li, Na, K, Cs, Ca, Mg, Ba and Sr.

5. The method in accordance with claim 1 wherein said water soluble carboxylic acid metal salt is a metal formate wherein the metal is selected from at least one of the group consisting of Li, Na, K, Cs, Ca, Mg, Ba and Sr.

6. The method in accordance with claim 1 wherein said water soluble carboxylic acid metal salt is a metal propionate wherein the metal is selected from at least one of the group consisting of Li, Na, K, Cs, Ca, Mg, Ba and Sr.

7. The method in accordance with claim 1 wherein said alkali or alkali earth metals are introduced to said alumina powder dissolved in said water.

8. The method in accordance with claim 1 wherein said water contains 1 to 40 wt. % potassium acetate.

9. The method in accordance with claim 1 wherein said water contains 1 to 55 wt. % potassium acetate.

10. The method in accordance with claim 1 wherein the water soluble carboxylic acid metal salt is selected from the group consisting of sodium and potassium formate.

11. The method in accordance with claim 1 wherein the water soluble carboxylic acid metal salt is selected from the group consisting of sodium and potassium proprionate are used.

12. The method in accordance with claim 1 wherein the water soluble carboxylic acid metal salt is selected from the group consisting of sodium and potassium acetate.

13. The method in accordance with claim 1 wherein said at least two water soluble carboxylic acid alkali or alkaline earth metal salts selected from the group consisting of formates, acetates, propionates and butyrates and introduced to said alumina powder dissolved in said water.

14. The method in accordance with claim 13 wherein the metal in the metal salts is selected from the group consisting of Li, Na, K, Cs, Ca, Mg and Ba.

15. The method in accordance with claim 1 wherein said alumina is flash calcined alumina.

16. The method in accordance with claim 1 wherein said alumina has an LOI (200° to 1100° C.) of 4 to 12 wt. %.

17. The method in accordance with claim 1 including contacting said alumina powder with said water as said powder is formed into said bodies.

18. The method in accordance with claim 1 including maintaining said water in a pH range of 10 to 13.8.

19. The method in accordance with claim 1 including thermally treating said composite bodies in a temperature range of 65° to 270° C. for a period of 0.5 to 12 hours followed by thermally treating in a temperature range of 270° to 700° C. for a period of 0.1 to 5 hours.

20. A method of preparing activated alumina composite bodies suitable for use as adsorbent or catalyst bodies comprising:
(a) providing a source of activated alumina powder for forming into bodies;
(b) providing an aqueous solution containing at least two different alkali or alkaline earth metals and at least one alkali or alkaline earth metals derived from a soluble organic compound of an alkali or alkaline earth metal salt or a water soluble alkali or alkaline earth metal inorganic salt;
(c) contacting said powder with said aqueous solution to provide composite bodies containing said alumina powder and said alkali or alkaline earth metals or alkali or alkaline earth metal salts; and
(d) thermally treating to calcine said composite bodies in a temperature range of about 200° to 1100° C. to activate alumina in said bodies.

21. The method in accordance with claim 20 wherein said contacting is achieved by spraying said powder with said solution as said bodies are forming.

22. The method in accordance with claim 20 wherein said soluble organic compound is carboxylic acid.

23. The method in accordance with claim 22 wherein said water soluble carboxylic acid metal salt comprises two metal acetates wherein the two metals are selected from the group consisting of Li, Na, K, Cs, Ca, Mg, Ba and Sr.

24. The method in accordance with claim 22 wherein said water soluble carboxylic acid metal salt is a metal formate wherein the metal is selected from at least one of the group consisting of Li, Na, K, Cs, Ca, Mg, Ba and Sr.

25. The method in accordance with claim 22 wherein said water soluble carboxylic acid metal salt is a metal proprionate wherein the metal is selected from at least one of the group consisting of Li, Na, K, Cs, Ca, Mg, Ba and Sr.

26. The method in accordance with claim 22 wherein said solution contains 1 to 40 wt. % sodium acetate and 1 to 55 wt. % potassium acetate.

27. The method in accordance with claim 22 wherein said solution has a pH in a range of 10 to 13.8.

28. The method in accordance with claim 20 including thermally treating said composite bodies in a temperature range of 65° to 270° C. for a period of 0.5 to 12 hours followed by thermally treating in a temperature range of 270° to 700° C. for a period of 0.1 to 5 hours.

29. A method of preparing activated alumina composite bodies containing at least two alkali or alkaline earth metal compounds, the bodies suitable for use as adsorbent or catalyst bodies comprising:
(a) providing a source of activated alumina powder containing an alkali or alkaline earth metal oxide for forming into bodies;
(b) providing an aqueous solution containing an alkali or alkaline earth metal derived from a soluble organic compound of an alkali or alkaline earth metal salt or a water soluble alkali or alkaline earth metal inorganic salt;
(c) contacting said powder with said aqueous solution as said powder is formed into said bodies to provide composite bodies containing said alumina powder and at least two alkali or alkaline earth metals or alkali or alkaline earth metal compounds; and
(d) thermally treating said composite bodies to activate alumina in said bodies.

30. The method in accordance with claim 29 wherein said contacting is achieved by spraying said powder with said solution as said bodies are forming.

31. The method in accordance with claim 29 wherein said soluble organic compound is carboxylic acid.

32. A method of preparing activated alumina composite bodies containing at least two alkali or alkaline earth metal compounds suitable for use as adsorbent or catalyst bodies comprising:
(a) providing a source of activated alumina powder for forming into bodies;
(b) providing an aqueous solution containing a first alkali or alkaline earth metal derived from a water soluble carboxylic acid alkali or alkaline earth metal salt or a water soluble alkali or alkaline earth metal inorganic salt;

(c) contacting said powder with said aqueous solution as said powder is formed into said bodies;

(d) adding a second alkali or alkaline earth metal compound powder to said alumina bodies during said forming to provide composite bodies containing alumina powder and at least two alkali or alkaline earth metals or alkaline earth metal salts; and (e) thermally treating said composite bodies to activate alumina in said bodies.

33. The method in accordance with claim 32 wherein said contacting is achieved by spraying said powder with said solution as said bodies are forming.

34. The method in accordance with claim 32 wherein said first carboxylic acid alkali metal salt is sodium acetate and said second alkaline earth metal compound is calcium hydroxide.

35. A method of preparing an activated alumina composite bodies containing at least two alkali or alkaline earth metal compounds suitable for use as an adsorbents or catalysts comprising:

(a) providing a source of activated alumina powder for forming into bodies;

(b) providing an aqueous solution containing at least two different water soluble carboxylic acid alkali or alkaline earth metal salts selected from the group consisting of formates, acetates, propionates and butyrates;

(c) contacting said powder with said solution as said powder is formed into said bodies to provide composite bodies containing said alumina powder and said alkali or alkaline earth metals or alkali or alkaline earth metal salts; and (d) thermally treating to calcine said composite bodies in a temperature range of about 200° to 1100° C. to activate alumina in said bodies.

36. The method in accordance with claim 35 wherein the metal salts are sodium and potassium acetate.

37. The method in accordance with claim 36 wherein said sodium acetate is present in said solutions in the range of 1 to 33 wt. % and said potassium acetate is present in the range of 1 to 55 wt. %.

38. The method in accordance with claim 35 including treating said bodies in a temperature range of 275° to 600° C. to activate said bodies.

39. The method in accordance with claim 35 wherein said solution is maintained in a pH range of 10 to 13.5.

40. The method in accordance with claim 35 including thermally treating said composite bodies in a temperature range of 65° to 270° C. for a period of 0.5 to 12 hours followed by thermally treating in a temperature range of 270° to 700° C. for a period of 0.1 to 5 hours.

41. Activated alumina composite bodies suitable for use as adsorbents or catalysts, the bodies formed from activated alumina powder bonded into said bodies, the bodies containing 0.3 to 8 wt. % sodium oxide and 0.2 to 17 wt. % potassium oxide, said composite bodies having a higher adsorbent capacity for $CO_2$ and a higher crush strength compared to bodies having substantially no potassium oxide.

42. The alumina composite bodies in accordance with claim 41 wherein said bodies have a pore volume distribution of at least 0.05 cc/g.

43. The alumina composite bodies in accordance with claim 41 wherein at least one of sodium oxide and potassium oxide is produced from one of the group selected from sodium or potassium formate, acetate and proprionate.

44. The alumina composite bodies in accordance with claim 41 wherein at least one of sodium oxide and potassium oxide is produced from sodium or potassium acetate.

45. The alumina composite bodies in accordance with claim 41 wherein the sodium oxide and potassium oxide are produced from a mixture of sodium acetate and potassium acetate.

46. The alumina composite bodies in accordance with claim 41 wherein said bodies contain 5 to $13\mu$ moles sodium oxide/$m^2$ surface area of said bodies and 5 to $9\mu$ moles potassium oxide/$m^2$ surface area of said bodies.

47. Activated alumina bodies suitable for use as adsorbents or catalysts, the bodies formed from activated alumina powder bonded into said bodies, containing a first alkali or alkaline earth metal compound and a second alkali or alkaline earth metal compound to provide two different alkali or alkaline earth metal compounds bonded to a surface of said bodies, the metal compounds being present on said surface in a ratio of 1:50 to 50:1, said first metal compound to said second metal compound, at least one of said first and second metal compound produced from a carboxylic acid salt of an alkali or alkaline earth metal, said alkali or alkaline earth metal compounds being present on said bodies in the range of 0.5 to $25\mu$ moles metal compound/$m^2$ of surface area of said bodies, said bodies having a higher adsorbent capacity and crush strength compared to bodies being substantially free of said second metal compound.

48. The alumina bodies in accordance with claim 47 wherein said bodies' activation results from heating at 270° to 500° F. followed by a second heating at 500° to 850° F.

49. The alumina bodies in accordance with claim 47 wherein said activated alumina powder has a particle size range of 0.1 to 100 $\mu$m.

50. The alumina bodies in accordance with claim 44 wherein the metal in said first and second alkali or alkaline earth metal compounds is selected from the group consisting of Li, Na, K, Cs, Ca, Mg and Ba.

51. The alumina bodies in accordance with claim 47 wherein the first and second metal in said first and second metal compounds are selected from the group consisting of Na and K, Na and Cs, K and Cs, Ca and K, Ca and Na.

52. Activated alumina bodies suitable for use as adsorbents or catalysts, the bodies formed from activated alumina powder bonded into said bodies, the bodies having a surface having an area in the range of 20 to 600 $m^2$/gm, the bodies containing a first alkali or alkaline earth metal compound and a second alkali or alkaline earth metal compound to provide two different alkali or alkaline earth metal compounds bonded to a surface of said bodies, the first and second metal compounds present on said surface in the range of 1 to $18\mu$ moles/$m^2$ of said surface, said metal compounds present on said surface in a ratio 1:50 to 50:1, said first metal compound to said second metal compound, said bodies upon activation having the capability to convert 1-hexene to 2-hexene at a lower temperature than alumina bodies having an equal amount of a single alkali or alkaline earth metal compound.

53. The alumina bodies in accordance with claim 52 wherein said activation results from heating said bodies at 65° to 270° C. followed by a second heating at 270° to 700° C.

54. The alumina bodies in accordance with claim 52 wherein said activated alumina powder has a particle size range of 0.1 to 100 $\mu$m.

55. The alumina bodies in accordance with claim 52 wherein the metal in said first and second alkali or alkaline earth metal compounds are selected from the group consisting of Li, Na, K, Cs, Ca, Mg and Ba.

56. The alumina bodies in accordance with claim 52 wherein the first and second metal in said first and second metal compounds are selected from the group consisting of Na and K, Na and Cs, K and Cs, Ca and K, Ca and Na.

57. Activated alumina composite bodies suitable for use as adsorbents or catalysts, the bodies formed from activated alumina powder having a surface area of 100 to 550 $m^2/g$ bonded into said bodies, the bodies containing 0.2 to 8 wt. % sodium oxide and 0.2 to 8 wt. % calcium oxide, said composite bodies having a higher adsorbent capacity for $CO_2$ and a higher crush strength compared to bodies having substantially no calcium oxide.

58. The alumina composite bodies in accordance with claim 57 wherein said bodies contain 0.2 to 6$\mu$ moles sodium oxide/m surface area of said bodies and 0.2 to 8$\mu$ moles calcium oxide/$m^2$ surface area of said bodies.

59. The alumina composite bodies in accordance with claim 58 wherein the sodium oxide is derived from sodium formate or acetate and said calcium oxide is derived from calcium hydroxide powder.

60. Activated alumina composite bodies suitable for use as adsorbents or catalysts, the bodies formed from activated alumina powder bonded into said bodies, the bodies containing at least two metal compounds selected from the group consisting of sodium and potassium, sodium and calcium, sodium and cesium, potassium and calcium, in an amount effective in producing higher adsorbent capacity for $CO_2$ compared to alumina bodies having a single metal compound selected from sodium, potassium, calcium and cesium.

* * * * *